Figure 1:
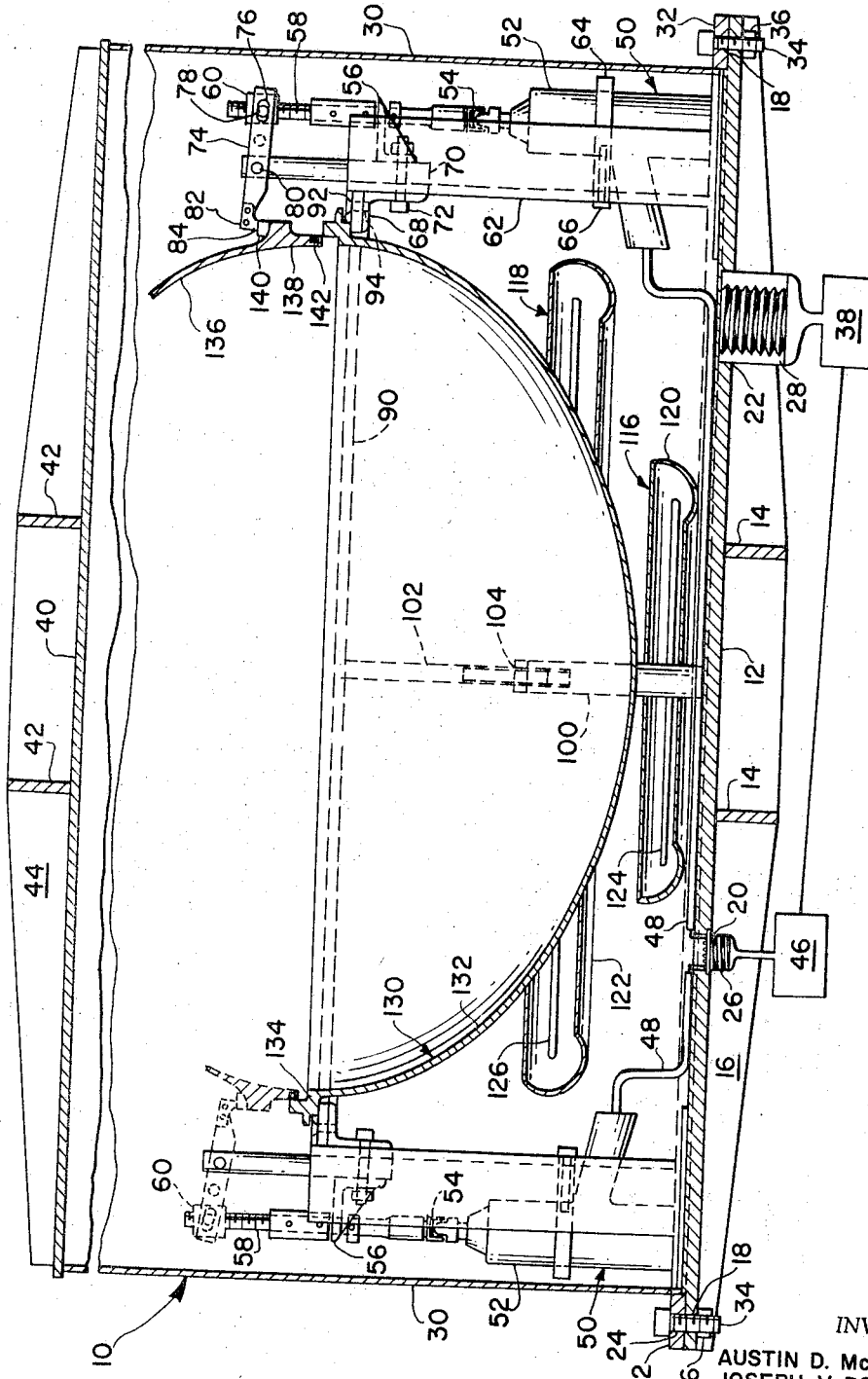

Aug. 22, 1967  A. D. McHATTON ETAL  3,336,725
CANISTER CLOSING DEVICE
Filed Sept. 30, 1964
2 Sheets-Sheet 1

INVENTORS
AUSTIN D. McHATTON
JOSEPH V. BOYLE, JR.
WILBERT C. FALK

BY

ATTORNEYS

United States Patent Office 3,336,725
Patented Aug. 22, 1967

3,336,725
CANISTER CLOSING DEVICE
Austin D. McHatton, Joseph V. Boyle, Jr., and Wilbert C. Falk, Hampton, Va., assignors to the United States of America as represented by the Administrator of the National Aeronautics and Space Administration
Filed Sept. 30, 1964, Ser. No. 400,613
13 Claims. (Cl. 53—102)

The invention described herein may be manufactured and used by or for the Government of the United States of America for governmental purposes without the payment of any royalties thereon or therefor.

This invention relates generally to a device for closing a container and more particularly to a remotely controlled mechanism for closing a container within a vacuum chamber.

There are various devices known in the prior art for closing or sealing containers in a vacuum environment. For example, the known machines for packaging and sealing foodstuffs either in glass jars or metal cans. Normally, such devices require merely a flat plate activated by a lever outside the vacuum chamber and so oriented that hand pressure or some other means of forcing the plate against the top of the jar is sufficient to maintain the top of the jar or can in place while being evacuated. Such prior art devices also have a multiplicity of means for preventing movement of the container or canister being closed that may also prevent rotation thereof. However, the generally known machines or devices are not capable of closing large containers to be filled with a frangible element in a substantially low vacuum environment. Further, the known devices for closing containers within a vacuum have no means for effectively governing the force to be applied against the elements being closed. When sealing containers to be utilized for conveying articles such as inflatable satellites into outer space, it becomes necessary to package such elements in an environment substantially equivalent to that where the article will be removed from the container and put into use. Such high level vacuum environments are not capable of duplication in conventional closing devices nor do presently known devices provide remotely controlled mechanisms which exert a predetermined and uniform force upon one of the container elements to be closed.

The present invention overcomes the difficulties inherent in the prior art by providing a remotely controlled mechanism in a vacuum chamber sufficiently large to contain the canister and article to be enclosed. A remotely controlled source of power acts on a drive mechanism and leverage system to effect closing of the canister within the vacuum environment.

It is an object of this invention to provide a device for closing a canister in a vacuum environment.

Another object of the instant invention is to provide a mechanism which may be remotely controlled to close a canister that is located in a vacuum chamber.

Still another object of the instant invention is to provide a vacuum chamber in which a canister is supported for closing by a remotely controlled mechanism that forces the top of the canister against the bottom thereof with a selective uniform pressure after the canister has been evacuated of substantially all gases.

A further object of this invention is to provide remotely controlled forces which establish uniform closing of a canister.

Another object of this invention is to provide a technique of closing a canister within a vacuum environment by a remotely controlled mechanism that provides a selectively predetermined and uniform closing force.

Generally, the foregoing and other objects are accomplished by mounting a plurality of equally spaced power posts, that is support members for both the canister and power mechanisms, such as impact wrenches or hydraulic cylinders, on the base of a vacuum chamber. Alternately spaced between the power posts are pod support mounts also fixed to the base of the vacuum chamber. Both the power posts and the pod support mounts are provided with a support flange and pad conforming to the shape of the flange or projection on the outer equatorial rim of the canister bottom. A leverage system connected to the power mechanism and extending inwardly fits the rim on the top of the canister so a force applied by the power mechanism causes the leverage system to force the top of the canister against the bottom thereof with a selective pressure. A plurality of heating units are located within the vacuum chamber for maintaining a uniform temperature.

Figure 2:
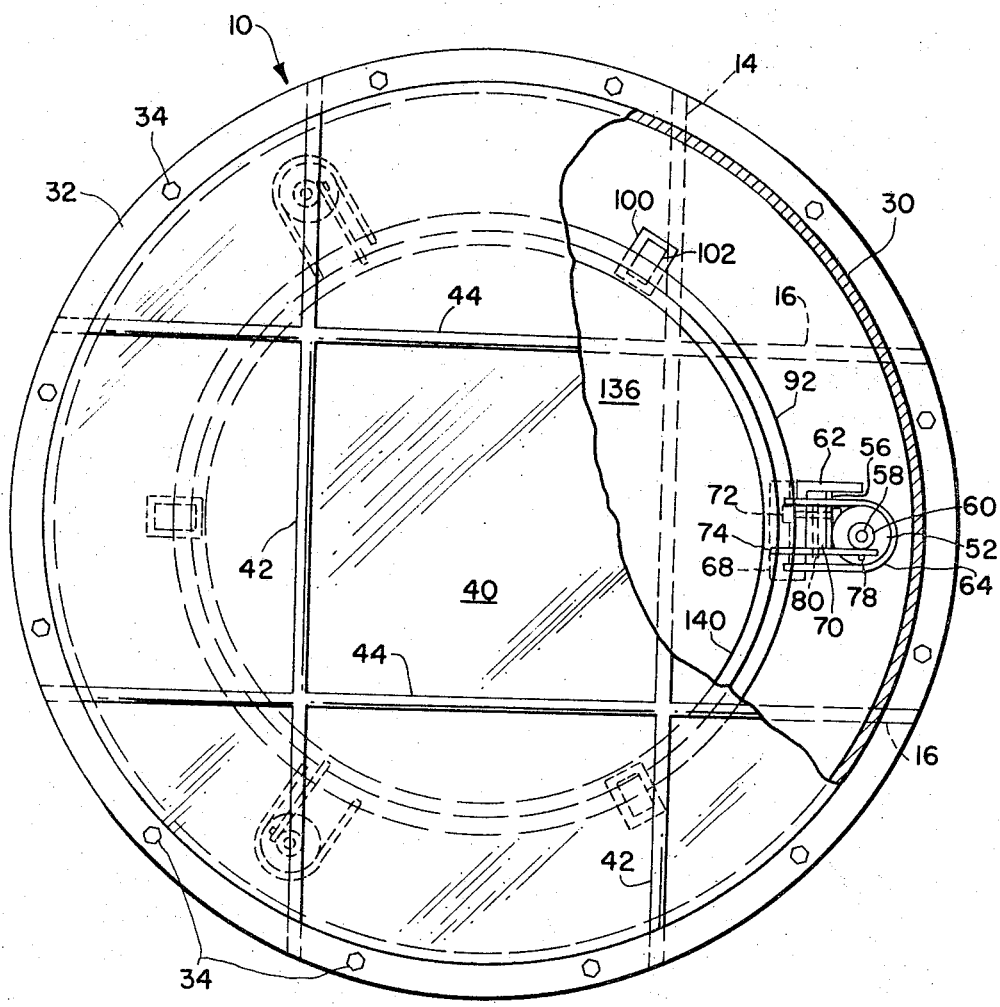

A more complete appreciation of the invention and many of the attendant advantages thereof will be readily apparent as the same becomes better understood by reference to the following detailed description when considered in connection with the accompanying drawings wherein:

FIG. 1 is a cross-sectional view of the chamber, the power mechanism and canister of the instant invention; and FIG. 2 is a plan view, with portions omitted for clarity, of an embodiment of the instant invention.

Referring now to the drawing wherein like reference numerals designate identical or corresponding parts throughout the several views and more particularly to FIG. 1 wherein a vacuum chamber, generally designated by numeral 10, is shown as having base 12 reinforced by beams 14 and 16 extending mutually perpendicular to one another. Base 12 is provided with a plurality of apertures 18 spaced about the perimeter thereof for use as will be described more fully hereinafter. Opening 20 in base 12 is provided with connection 26 for conduits conveying the power for the power mechanisms. Aperture 22 in base 12 is provided with connection 28 to provide communication between vacuum pump 38 and the interior of chamber 10.

Sidewall 30 forms the upright portion of chamber 10 and is shown in FIG. 1 as being integral with roof 40 which has mutually perpendicular beams 42 and 44. Sidewall 30 also has integral flanges 32 provided with spaced apertures 24 about the perimeter thereof and in a mating location with apertures 18 in base 12. Bolts 34 extend through apertures 18 and 24 and threadingly engage nuts 36 to secure the upper portion of chamber 10 to base 12.

In order to provide visual access to the interior of chamber 10, sidewall 30 may be constructed to include a plurality of glass viewing ports, not shown. If visual access is desired, it may be necessary to mount light fixtures on base 12 and roof 40 in any well known manner.

Still referring to FIG. 1, control operator 46 is connected to connector 26 and vacuum pump 38 for initiating the remote control signals for power mechanism or activator 52 and to establish and maintain the desired vacuum in chamber 10. Power conduits 48 extend from connection 26 to establish the necessary power and convey signals for operation of power mechanism 52 to be more fully described hereinbelow.

Power posts 50 are mounted on base 12 of chamber 10 and include power or drive mechanism 52 and upright angle 62 which supports the canister. Power mechanism 52, such as an impact wrench, electric motor or hydraulic cylinder, has shaft connector 54 which extends through angle 56 and is secured to shaft 58. As shown in FIG. 1, shaft 58 is threaded and power mechanism 52 is an electrical impact wrench that rotates shaft 58 within shaft attachment 60. Power mechanism holder 64 is secured by bolt 66 to upright angle 62 of power post 50. Angle 68 is horizontally disposed and secured to vertical angle 62 at the top thereof. A vertical lever fulcrum projection 70 is secured to upright angle 62 and horizontal angle 68 by bolt 72.

A leverage closure system is secured in a pivotal relationship to shaft attachment 60 and lever fulcrum projection 70. That is, lever 74 is pivotally mounted on pivot pin 78 extending from shaft attachment 60 for a sliding type movement in slot 76 of lever 74. Lever 74 is pivoted on connection 80 of fulcrum projection 70 and extends inwardly toward the center of chamber 10 where boss 84 on inner lever tip 82 engages the upper half of the canister as will be more fully described hereinafter.

As more clearly seen in FIG. 1, the upper horizontal flange of angle 68 is provided with support ring 90 upon which pad 92 rests. Pad 92 is formed of a soft smoothly finished material having a configuration such that it and support ring 90 provide a rabbet conforming to the shape of the outer flange of the lower portion of the canister. Support ring 90, pad 92 and angle 68 are secured in a manner to prevent relative rotation thereof by key 94.

Alternatingly spaced, preferably midway, between power posts 50 are pod mounts 100 having extensions 102 which support ring 90 between the points at which it is supported by posts 50 to form a pedestal for the canister. Pod mounts 100 are fixedly secured to base 12 and are spaced at 60 to 120 degrees apart and midway between posts 50 which are also spaced 60 to 120 degrees apart. Extension 102 is maintained at the required position by some type of conventional locking device 104.

In order to maintain a uniform temperature within vacuum chamber 10, a plurality of heaters 116 and 118 are located therewithin and so as to fit about the canister. Since the contemplated canister configuration is substantially circular, heating elements 116 and 118 are shown as being circular and having different diameters so they may be spaced vertically about the canister. Each of heating units 116 and 118 is respectively provided with reflectors 120 and 122 and heating elements 124 and 126. Heating units 116 and 118 are contemplated as being electrical with heating elements 124 and 126 attached to connector 26.

Canister 130 is shown as having a lower half 132 with flange 134 extending outwardly therefrom and upper half 136 having flange 138 extending outwardly therefrom. Although shown as being substantially hemispherical shape, canister 130 could be of any configuration and, as is generally conventional, flanges 134 and 138 are shaped for mating engagement of one another with seal 142, such as an O-ring seal, positioned therebetween.

*Operation*

Once base 12 has been positioned with power posts 50 and pod mounts 100 secured in place and supporting ring 90 and pad 92 mounted thereon, operator controls 46 are attached to connection 26 and pump 38 and canister 130 is placed in such a manner that flange 134 rests upon support ring 90 and pad 92. With canister 130 in position any instrumentation necessary for determining matters such as temperature and pressure is connected and closing ring 140 is placed over flange 138. Boss 84 on tip 82 of lever 74 is then positioned over closing ring 140 and power mechanisms 52 with their attendant appendages are adjusted to leave a small opening between upper canister half 136 and lower half 132. Heating units 116 and 118 are secured in place and attached to connector 26.

Chamber 10 is closed by positioning cover 40 and sidewall 30 in place with apertures 24 and 18 in flange 32 and base 12 aligned. Bolts 34 are inserted and nuts 36 applied to effect a vacuum-tight closure between flange 32 and base 12. Operator control 46 starts pump 38 to evacuate chamber 10 and maintain the desired vacuum. After insuring that the desired vacuum has been established and that all gases have been removed from the article or articles placed within canister 130, impact wrenches 52 are activated by operator control 46.

Activation of impact wrenches 52 causes rotation of shaft connector 54 and threaded shaft 58 which forces shaft attachment 60 upward and pivots lever 74 about fulcrum extension 70 thereby causing boss 84 of tip 82 to exert pressure downwardly on closing ring 140 and upper canister half 136. Depending upon the condition of canister 130 and other circumstances, it may be desirable to activate impact wrenches 52 simultaneously or sequentially in a clockwise direction. As used herein, uniform pressure refers to the degree of force applied by each of the power mechanisms which is capable of individual determination thereby permitting the same amount of pressure to be applied to close the halves of the canister at the points where levers 74 react with ring 140. Measurement of the current needed to operate each wrench determines the closing force exerted by that wrench and lever. Variations in force may be accomplished by the use of a voltage regulator.

Once the proper amount of force has been applied and canister 130 closed, control operator 46 may be used to shut down vacuum pump 38 and thus permit chamber 10 to return to atmospheric pressure. The considerably greater pressure on the external surfaces acts with seal 142 to prevent separation of canister halves 132 and 136. removal of bolts 34 permits separation of flange 32 from base 12 and removal of chamber cover 40.

Thus, it is seen that the present invention exerts a uniform force, governed remotely, to close a relatively large canister within a vacuum environment with a selective uniform pressure, thereby permitting fragile articles to be packaged in a manner preventing damage during enclosure and at the site of use.

Obviously, many modifications and variations of the subject invention are possible in the light of the above teachings. It is, therefore, to be understood that within the scope of the appended claims the invention may be practiced otherwise than as specifically described.

What is claimed as new and desired to be secured by Letters Patent of the United States is:

1. A device for closing a canister in a vacuum environment comprising: a chamber having a base and a roof with a depending sidewall; leverage means for effecting closure of the canister by forcing the top onto the bottom thereof; a plurality of pod mounts and a plurality of posts having extensions pivotally attached to said leverage means and secured to said base to form the pedestal for the canister to be closed; activator means within said chamber for forcing said leverage means to act upon the canister; and operator means outside said chamber for remotely controlling said activator means.

2. The canister closing device of claim 1 wherein said activator means comprises impact wrenches attached to a shaft which threadedly engages said leverage means.

3. The canister closing device of claim 2 wherein the pod mounts and posts are alternately spaced about the perimeter of the chamber for support of the canister; and a pad on the upper surface of said pod mounts and posts.

4. The canister closing device of claim 2 including heating units within the chamber.

5. A canister closing device comprising: a vacuum chamber having a base and roof member; a plurality of alternating pod mounts and posts uniformly spaced about said base; leverage means pivotally mounted on said posts for effecting closure of the canister; activator means supported by said posts and engaging said leverage means for causing movement thereof; operator means outside said vacuum chamber and connected to said activator means for remotely controlling said activator means; and evacuating means connected to said chamber for establishing and maintaining a vacuum therein whereby a remotely controlled selective force may be applied concurrently or sequentially by said leverage means to effect closure of the canister.

6. The canister closing device of claim 5 wherein the activator means comprises impact wrenches.

7. The canister closing device of claim 5 wherein the activator means comprises an electric motor.

8. A remotely controlled canister closing device comprising: a base having a plurality of apertures therethrough; a cover having a depending sidewall with an outwardly extending flange at the extremity thereof for attachment to said base to form a chamber; means for establishing and maintaining a vacuum connected to at least one of said base apertures; a plurality of spaced supports fixed to and extending upwardly from said base inwardly of said sidewall; a plurality of spaced power posts fixed to and extending upwardly from said base; said supports and power posts having upper surfaces adapted to receive the canister to be closed; impact wrenches secured to said power posts and connected to a threaded shaft; power conduits connected to said impact wrenches and extending to a connection secured in at least one of said base apertures; a mating shaft attachment threadedly mounted on said impact wrench shaft; a fulcrum projection extending upwardly from said power posts; a lever pivotally mounted on said fulcrum projection and shaft attachment and extending inwardly toward the center of the chamber formed by said base and cover; and a boss on the inward end of said lever adapted to fit the flange of the canister to be closed whereby activation of the impact wrenches causes rotation of the shaft to move the attachment and rotate the lever about the fulcrum projection pivot and thereby force the top of the canister against the bottom thereof with a selective uniform pressure.

9. The canister closing device of claim 8 wherein the impact wrenches are electrically powered.

10. The canister closing device of claim 8 wherein a fitting is secured about at least one of the base apertures; said fitting adapted for connection to a vacuum pump.

11. The canister closing device of claim 8 wherein a pad is secured to the upper surfaces of said supports and power posts.

12. The canister closing device of claim 8 wherein a plurality of heating units are located about the interior of the chamber so as to extend about the perimeter of the canister.

13. The canister closing device of claim 12 wherein the heating units comprise an electrical heating element; and a hemispherical reflector for reflecting heat toward the canister.

References Cited

UNITED STATES PATENTS

| 1,945,954 | 2/1934 | Podel | 53—95 |
| 2,684,777 | 7/1954 | Danzin et al. | 53—9 X |
| 2,710,713 | 6/1955 | Slater | 53—22 |

TRAVIS S. McGEHEE, *Primary Examiner.*